3,152,053
Patented Oct. 6, 1964

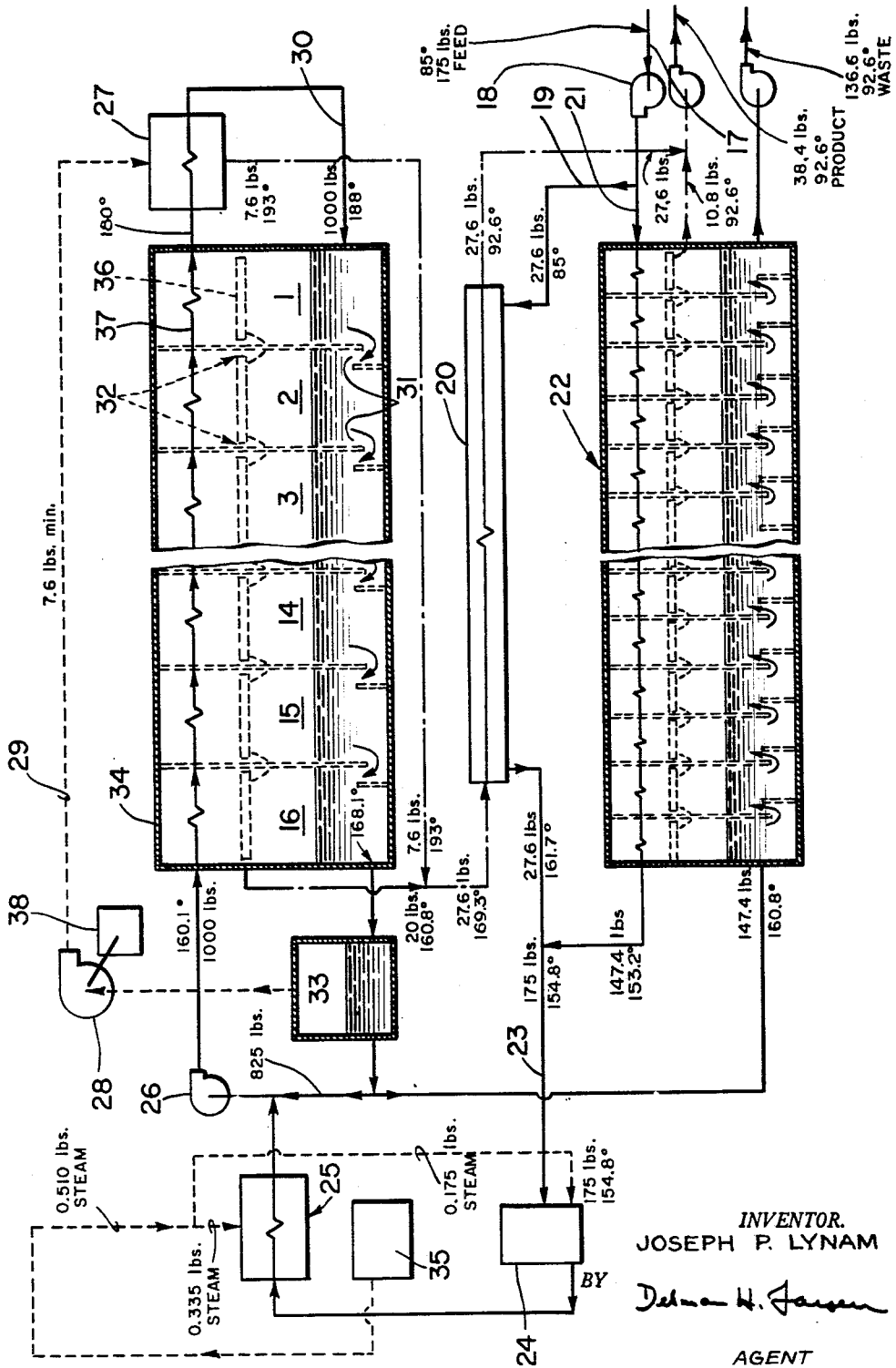

3,152,053
SEA WATER CONVERSION APPARATUS
Joseph P. Lynam, Los Angeles, Calif.
(3110 Mount Vernon Ave., Alexandria, Va.)
Filed July 26, 1960, Ser. No. 45,466
2 Claims. (Cl. 202—173)

This invention relates in general to an improved apparatus for the distillation of water, and more particularly to a process and apparatus suitable for the production of large quantities of potable water from brackish or sea water with high economy.

The invention contemplates the employement of compression-distillation and multi-stage flash evaporation in certain novel and original manners to this end.

My invention may be better understood in the light of a brief discussion of certain features of the prior art, as follows:

An advantage of compression-distillation resides in the fact that it is a regenartive process which has a great thermodynamic advantage over thermal distillation with consequent reduction in the amount of fuel or energy required. The principle has been adapted to the distillation of sea water and other solutions by various workers, in single-effect or single stage arrangements.

Now, the principle of multi-stage flash evaporation is also known and has been applied to water distillation problems.

This process is also regenerative, and consists of a number of condenser sections in series through which the saline solution flows. Each condenser is associated with a flash chamber and these flash chambers are arranged in series so that the solution can flow through them in the reverse direction to that in the condenser sections.

As the sea water flows through the condenser sections it is heated by the condensation of the vapor evolved in the flash chambers. When it leaves the last section its temperature is further increased in a heater, which might, for example, be another condenser section supplied with steam from a boiler or the exhaust from a steam turbine.

Leaving the heater the water enters the first flash chamber which is associated with the last condenser section of the evaporator and, since it is at a higher temperature than the tubes of the condenser section, a portion of it will flash into steam and condense on the tubes of the condenser section. It then flows through a trap or baffle arrangement into the next flash chamber diminished slightly in volume and in temperature, but, since the water flowing in the corresponding condenser section is also lower in temperature a portion will again flash into steam and condense on the tubes of the condenser. This process is repeated through each stage of the evaporator.

The condensed steam is caught in trays located beneath the tubes of the condenser section and is the product of the apparatus. It can be removed from each section as it is formed. However, if it is made to flow from section to section through some form of liquid trap in the same direction as the flashing stream a small portion of it will reevaporate and recondense in the section at a lower temperature, with the result that the temperature difference between the flashing stream and the condenser stream will remain substantially constant through all the stages of the evaporator.

Clearly, many physical arrangements of the components of a multi-flash evaporator can be made. Thus, each stage, consisting of a condenser section, a flash chamber and an arrangement for capturing the condensate, might be contained in a separate vessel and the various stages could be connected by pipes or conduits to form the complete multi-stage unit. The condenser might consist of tubes arranged vertically, horizontally or at an angle and might be straight tubes, U-tubes, or it might consist of some form of plate type unit. Furthermore, the flash chamber and its corresponding condenser section might be arranged in different positions relative to one another, e.g. superimposed, side by side, or otherwise.

For ease and economy of manufacture, however, multistage flash evaporators are usually arranged in one or more vessels each of which contains several stages separated from each other by baffles. Thus a number of stages might be contained in a long vessel subdivided by transverse baffles through which the condenser, in the form of tubes, would extend continuously, the portion lying between two baffles forming a condenser section associated with a flash chamber contained between the same two baffles. The flashing stream would pass through the baffles in some form of liquid trap or submerged opening so that the vapor space of each stage would be isolated from those adjacent.

As pointed out above, the multi-stage flash evaporator is regenerative within itself since the heat lost from the flashing liquid in any stage is transferred to the condenser stream in the same stage. As a result, the yield of condensate per unit heat input into the heater increases with the number of stages and the economy of the apparatus improves.

The prior art describes a method in which a supplementary flash chamber at the high temperature end of the main multi-stage evaporator in conjunction with a vapor compressor and condenser (salt water heater) provide the temperature difference necessary to the operation of the evaporator. An amount of water in excess of that flowing in the evaporator is circulated through this flash chamber where a portion flashes into steam. The steam is compressed and condensed in the salt water heater transferring its latent heat plus the heat of compression to the water flowing in the latter. An amount of water is diverted from this circulating stream after it has flashed and becomes the flashing stream of the evaporator. The remainder combines with the condenser stream after it leaves the highest temperature section of the evaporator to form the stream entering the salt water heater and returning thence to the supplementary flash chamber. The condenser stream referred to must equal in quantity the amount diverted to form the flashing stream plus the amount evaporated.

This prior art arrangement combining as it does the "heat pump" effect of compression distillation with the regenerative effect of multi-stage flash evaporation is economical in operation. However, it has some inherent drawbacks from a technical or manufacturing point of view. Thus, a unit of large capacity and of very high economy would require an extremely large recirculating pump for the heater circuit.

The present invention enables one to realize the high coefficient of performance of compression distillation and the high economy of multi-stage flash distillation by means of an entirely novel arrangement which permits wide latitude of choice of operating conditions and economy of manufacture.

Generally speaking and in accordance with an illustrative embodiment of my invention, I provide a multistage flash evaporator with an auxiliary condenser or heater in the conventional position between the exit from the condenser sections of the evaporator and the entrance to the flash stages thereof; an auxiliary flash chamber downstream from the exit from the flash chambers of the evaporator, and a mechanically driven vapor compressor which draws low pressure vapor from the auxiliary flash chamber and discharges it at a higher pressure into the shell of the heater. In this manner, the brine leaving the evaporator is further flash cooled in the auxiliary flash chamber and the heat removed plus the heat of compression is transferred to the heater.

The brine leaving the auxiliary flash chamber divides into two streams. One stream joins the incoming preheated feed water and with it is recirculated into the condenser tubes of the evaporator. The other stream is discharged to waste through the flash chambers of an auxiliary multi-stage evaporator counterflow to a portion of the incoming feed. An additional quantity of distilled water is realized in the auxiliary heater and the major portion of the heat of the waste brine (above the temperature of the source) is transferred to the incoming brine and thus returned to the system. (This heat transfer may be effected in a conventional heat exchanger but the additional yield of distilled water will not then result.) Since the auxiliary evporator produces distilled water with no additional expenditure of fuel, it is economically desirable to increase its capacity, and the amount of feed water, to as high an extent as is compatible with the heat balance of the system. Additional advantages accruing from the arrangement are that the increase of salinity of the circulating brine is low which is desirable from the point of view of scale formation, and the increase of the boiling point due to dissolved solids is kept low, which is thermodynamically advantageous.

(In a typical case, approximately one quarter of the total output of the plant is produced by the auxiliary evaporator, and with sea water feed containing 33,000 p.p.m. (parts per million) of dissolved solids, the maximum salinity of the brine circulating in the plant is about 40,000 p.p.m.—T.D.S.)

The distillate produced in the heater and in the main evaporator is used in a conventional counterflow heat exchanger to heat another amount of incoming feed water which joins the stream from the auxiliary evaporator to form the full incoming stream. This stream is further heated in an auxiliary feed water heater before joining the recirculating stream from the auxiliary flash chamber to form the stream entering the condenser tubes of the main evaporator. The auxiliary feed water heater is preferably supplied with steam from a waste heat boiler operating on the thermal losses of an internal combustion prime mover. Alternatively, heat from other sources may be utilized. Thus if steam is used to provide power for the system, a part of the exhaust can be utilized in the auxiliary feed water heater and the balance may be condensed in an auxiliary circulating brine heater located downstream from the main heater, thus relieving the duty of the compressor.

A second auxiliary multi-flash evaporator may be used instead of a conventional heat exchanger to cool the outflowing distillate from the heater and main evaporator. No additional yield will then result. However, the distilled water produced by such an evaporator would be double distilled water of high chemical purity which of course has considerable commercial value.

The invention will now be exemplified by describing in detail the arrangement set forth in the drawings, which is the best mode of carrying out the invention of which I am aware. For clarity in presentation, the drawings are semi-diagrammatic. It will be understood that the individual components, such as heat exchangers, pumps, boilers, flash evaporators, and the like, are all well-known to those skilled in the art, and need not be detailed more than follows in the specific description and accompanying figures.

In the accompanying drawings, FIGURE 1 is a diagrammatic representation of the components of the improved apparatus, indicating the regenerative effect of the multi-stage flash evaporator and of the compression-distillation arrangement. The figures given are based on operating conditions which have been selected as best for illustrative purposes. The multi-stage evaporator is selected to operate through a range of approximately 20° F. in both condenser and flashing streams with a maximum temperature below 190° F. (above which temperature experience indicates that hard scale is likely to form.) The sea water temperature is assumed to be 85° F. The diagram is based on 1,000 lbs. per minute (pure water equivalent) circulating through the condenser sections of the evaporator.

In FIGURE 1 the reference numerals 1 to 16 represent the several chambers of a 16-stage flash evaporator 34.

Salt water is introduced into the system through conduit 17 and pump 18. The stream divides, part passing by way of conduit 19 into and through the heat exchanger 20 where it is heated in counterflow by the emerging distilled water, and part passing by conduit 21 into the condenser tubes of auxiliary or secondary multi-stage evaporator 22 which is downstream from the main evaporator, and which may for example have 35 stages, in view of the temperature difference from one end to the other, where it is heated by the condensation of vapor flashed from the waste sea water emerging from the auxiliary flash chamber 33. The streams rejoin and pass through conduit 23 to deaerator 24 and then to auxiliary heater 25 which is supplied with steam from a waste heat boiler 35 and is further heated. It then joins with the recirculated water from conduit 23 before entering main circulating pump 26.

The combined feed water and recirculated water then enters the condenser tubes of the main evaporator 34 where its temperature is increased by the condensation of vapor in the successive chambers of stage 1–16. It then passes through the tubes of heater 27 and its temperature is further increased by the condensation of vapor discharged by compressor 28 through conduit 29 into the shell of 27.

The circulating water then enters stage 1 of the main evaporator through conduit 30 and becomes the evaporating (flashing) stream of the main evaporator, passing from stage to stage through successive ports 31.

Since it is at a higher temperature than the water passing through the condenser tubes in the same section, a portion of water will flash into steam which will condense on the condenser tubes. At a lower temperature the water passes through the submerged baffle or trap into stage 2. In stage 2 the condenser tubes are at a still lower temperature and a flashing and condensing process similar to that in stage 1. This continues through all the stages of the evaporator at a decreasing temperature in each stage until the water leaves the last stage and enters the auxiliary flash chamber 33. In each stage the pressure is the saturated vapor pressure corresponding to the temperature of the fluid in the stage.

In conduit 23 the pressure is further reduced by the action of compressor 28, a further amount of water flashes into steam, which is removed by the compressor, and its temperature is further reduced.

The fluid emerging from conduit 23 splits into two streams; one flows to waste through the auxiliary multistage flash evaporator in counterflow to the incoming feed water, and is further flash cooled therein.

The condensate forming on the condenser tubes 37 in the main evaporator 34 is caught in trays 36 underneath the tubes, or by other means, and flows from stage to stage through traps 32 emerging at the low temperature end at substantially the same temperature as the flashing stream. This condensate combines with the condensate from the heater 27 (which represents the amount flashed from the auxiliary flash chamber 22 and compressed by 28) and is passed through the heat exchanger 20 in counterflow to a portion of the incoming feed (or through an auxiliary multi-stage flash evaporator not shown, in case a quantity of double distilled water is desired), heating it.

The total yield of potable water consists of the condensate from the heater 27, the condensate from the main evaporator and the condensate from the auxiliary evaporator 22.

The compressor 28 is actuated by driving means 38, which may be a steam turbine, in which case the exhaust from the turbine is condensed in 24 whence it is returned to the boiler. Or it can be driven directly or indirectly by a driving means 38 in the form of an internal combustion engine such as a diesel engine, a gas turbine, or a free-piston gas generator gas turbine combination. In such a case, waste heat from the prime mover is used to produce steam in a waste heat boiler which is used in the auxiliary feed water heater and in the deaerator 25 as indicated.

The prime mover should of course be of sufficient capacity to provide the power required for the main circulating pump 26 and other auxiliary pumps and devices, unless it is desired that a separate power source be provided for this purpose.

The invention has been described in terms of sea-water purification, but it will be clear that the same apparatus and process can be used for the purification by distillation of liquids generally, where the liquid contains a burden of dissolved contaminant removable by distillation.

Again, the heater or auxiliary condenser 27 has been described, for convenience, in terms of vapor on the shell side and liquid in the tubes. It is obvious that this arrangement can be reversed, and the claims are to be so understood.

It will be clear that while the invention has been described and explained in terms of specific apparatus, various changes, substitutions, and the like are possible within the broad scope of the invention and that of the claims which follow.

Having described the invention, I claim:

1. Apparatus for the recovery of purified distillate from liquid feed comprising, in combination: a primary flash evaporator having a plurality of stages embodying flash sections and condenser sections including a heat transfer conduit traversing said condenser sections having an inlet at the final stage and an outlet at the initial stage of said primary flash evaporator; a secondary flash evaporator having a plurality of stages embodying flash sections and condenser sections; an auxiliary flash chamber connected to the final flash section of said primary flash evaporator to receive spent liquid discharge therefrom; an auxiliary condenser having a shell section and a tube section, said tube section being connected between said heat transfer conduit outlet and the initial flash section of said primary flash evaporator; means for pumping the feed as cooling medium through said heat transfer conduit and thence through said tube section; and a vapor compressor receiving vapor from said auxiliary flash chamber and delivering it in compressed form to the shell section of said auxiliary condenser, said secondary flash evaporator receiving a portion of the spent liquid discharged from said primary flash evaporator through said auxiliary flash chamber.

2. Apparatus for the recovery of purified distillate from liquid feed comprising, in combination: a primary flash evaporator having a plurality of stages embodying flash sections and condenser sections including a heat transfer conduit traversing said condenser sections having an inlet at the final stage and an outlet at the initial stage of said primary flash evaporator; a secondary flash evaporator having a plurality of stages embodying flash sections and condenser sections; an auxiliary flash chamber connected to the final flash section of said primary flash evaporator to receive spent liquid discharge therefrom; an auxiliary condenser having a shell section and a tube section, said tube section being connected between said heat transfer conduit outlet and the initial flash section of said primary flash evaporator; means for pumping the feed as cooling medium through said heat transfer conduit and thence through said tube section; a vapor compressor receiving vapor from said auxiliary flash chamber and delivering it in compressed form to the shell section of said auxiliary condenser, said secondary flash evaporator receiving a portion of the spent liquid discharged from said primary flash evaporator through said auxiliary flash chamber; and heat exchange means transferring heat from the condensed distillate recovered from said primary flash evaporator and said auxiliary condenser to at least a portion of input liquid to said apparatus.

References Cited in the file of this patent

UNITED STATES PATENTS

| 2,759,882 | Worthen et al. | Aug. 21, 1956 |

FOREIGN PATENTS

| 16,035 | Great Britain | of 1897 |
| 770,761 | Great Britain | Mar. 27, 1957 |
| 924,027 | Germany | Feb. 24, 1955 |